United States Patent [19]
McMurdie et al.

[11] Patent Number: 6,110,341
[45] Date of Patent: Aug. 29, 2000

[54] ELECTRODEPOSITION BATHS CONTAINING ORGANIC PHOSPHOROUS-BASED COMPOUNDS

[75] Inventors: Neil D. McMurdie, Pittsburgh; Robert R. Zwack, Allison Park, both of Pa.

[73] Assignee: PPG Industries Ohio, Inc., Cleveland, Ohio

[21] Appl. No.: 09/177,270

[22] Filed: Oct. 22, 1998

[51] Int. Cl.$^7$ .............................. C09D 5/44; C08L 63/00
[52] U.S. Cl. .................. 204/489; 204/504; 204/506; 523/415; 524/901
[58] Field of Search .................... 204/504, 506, 204/489; 523/415; 524/901

[56] References Cited

U.S. PATENT DOCUMENTS

| | | | |
|---|---|---|---|
| 4,218,296 | 8/1980 | Gilchrist | 204/181 |
| 5,545,702 | 8/1996 | Oishi et al. | 525/509 |
| 5,760,107 | 6/1998 | Valko et al. | 204/504 |

FOREIGN PATENT DOCUMENTS

| | | |
|---|---|---|
| 19911127 | of 1991 | Japan . |
| 08003772 | 6/1994 | Japan . |

OTHER PUBLICATIONS

A.A. Taha, I.Z. Selim, "Evaluation of Some Amino Acids as Corrosion Inhibitors for Carbon Steel in Sulfuric Acid Solutions at different Temperatures", Egypt. J. Chem. 38(2), 141–55, 1995. (English abstract).

*Primary Examiner*—Kathryn Gorgos
*Assistant Examiner*—Thao Tran
*Attorney, Agent, or Firm*—William J. Uhl

[57] ABSTRACT

Disclosed is an improved electrodeposition bath composition which is comprised of a resinous phase dispersed in an aqueous medium, the resinous phase comprising an active hydrogen group-containing cationic electrodepositable resin and a curing agent having functional groups reactive with the active hydrogen groups of the resin. The improvement comprises the inclusion in the electrodeposition bath composition of an organic phosphorous-based compound of specific structures. The electrodeposition bath compositions provide excellent corrosion resistance to electrocoated substrates, particularly untreated steel, and reduced corrosivity of the acidic cationic electrodeposition bath to steel equipment and pipes. Also disclosed is a method of electrocoating a conductive substrate using the improved electrodeposition bath compositions of the invention. Metallic substrates coated by this method are also disclosed.

19 Claims, No Drawings

ELECTRODEPOSITION BATHS CONTAINING ORGANIC PHOSPHOROUS-BASED COMPOUNDS

FIELD OF THE INVENTION

The present invention relates to improved electrodeposition bath compositions, particularly lead-free electrodeposition bath compositions, containing a resinous phase dispersed in an aqueous phase, wherein the resinous phase is comprised of an active hydrogen group-containing cationic electrodepositable resin and a curing agent having functional groups reactive with the active hydrogen groups of the resin, and an organic phosphorous-based compound of a specific structure. The invention also relates to the use of these compositions in a method of electrodeposition. More particularly, this invention relates to electrodeposition bath compositions which provide improved corrosion resistance of coated steel substrates and reduced corrosivity to surfaces of steel pipes and other steel electrodeposition bath equipment.

BACKGROUND OF THE INVENTION

Electrodeposition as a coating application method involves deposition of a film-forming composition onto a conductive substrate under the influence of an applied electrical potential. Electrodeposition has become increasingly important in the coatings industry because, by comparison with non-electrophoretic coating means, electrodeposition offers increased paint utilization, improved corrosion protection and low environmental contamination.

Initially, electrodeposition was conducted with the workpiece being coated serving as the anode. This was familiarly referred to as anionic electrodeposition. However, in 1972, cationic electrodeposition was introduced commercially. Since that time, cationic electrodeposition has steadily gained in popularity and today is by far the most prevalent method of electrodeposition. Throughout the world, more than 80 percent of all motor vehicles produced are given a primer coating by cationic electrodeposition.

Typically, electrodepositable coatings comprise an electrodepositable film-forming polymer and a curing agent therefor, in combination with, inter alia, various pigments. Lead-containing pigments such as lead silica chromate, basic lead silicate, lead chromate and lead sulfate are often used in electrodepositable coatings because they impart excellent corrosion resistance to the electrocoated article.

The acid used in cationic electrodeposition baths often solubilizes a portion of the lead pigment, thereby forming lead salts which are soluble in the aqueous phase of the electrodeposition bath. The lead ion is conveniently reduced to elemental lead in the presence of "mild steel", such as, the non-stainless steel pipes and equipment typically used in electrodeposition equipment. The elemental lead "plates out" or deposits on the surface of the mild steel surfaces which are in constant contact with the acidic electrodeposition bath compositions, forming a passivation or protective coating thereon. This lead passivation layer retards further oxidation of the mild steel surfaces by the acidic bath. Unfortunately, however, a portion of these lead salts often finds its way into the ultrafiltrate of the bath, thus necessitating the removal and subsequent disposal of metallic lead and/or ionic or organic lead-containing materials.

In recent years, due to environmental concerns, the use of lead-free coatings has been mandated. Although surface coatings of excellent quality can be achieved by means of cationic electrodeposition of lead-free coatings, the removal of corrosion inhibitive lead pigments can result in poor corrosion resistance of these coatings, particularly when applied to untreated steel substrates. Moreover, in lead-free electrodeposition baths, the mild steel pipes and equipment are left unprotected and are subjected to corrosive attack by the acidic cationic electrodeposition bath composition.

The use of phosphoric acid in electrodeposition baths for reducing corrosivity of electrodeposition baths is well known in the art. Also, U.S. Pat. No. 4,218,296 discloses the use of $C_1$–$C_4$ fatty acid anions in conjunction with $H_2PO_4^-$ anions as counterions to balance the ionized cationogenic sites of a cathodically electrodepositable resin, which suppresses both iron staining of the coating and corrosion of iron and steel electrodeposition equipment. The addition of phosphoric acid to electrodeposition baths at levels high enough to effectuate such improvements, however, typically results in poor appearance, i.e., pinholing, of the resultant coating, believed to be caused by gas evolution at the cathode.

The addition of other phosphorous-based compounds, particularly organic phosphorous-based acids and esters, to improve corrosion resistance of the electrocoated article and reduce the corrosivity of lead-free cationic electrodeposition baths is not known. It therefore, would be desirable to provide an electrodeposition bath composition, particularly a lead-free electrodeposition bath, which provides improved corrosion resistance of the electrocoated article as well as a reduction in corrosivity of the bath equivalent to that of phosphoric acid, without adversely affecting appearance of the resultant coating.

SUMMARY OF THE INVENTION

In accordance with the present invention, an electrodeposition bath composition, having improved corrosion resistance and reduced mild steel corrosivity, comprising a resinous phase dispersed in an aqueous medium is provided. The resinous phase comprises the following components:

(a) an ungelled active hydrogen group-containing cationic electrodepositable resin, and (b) a curing agent having functional groups which are reactive with the active hydrogen groups of (a).

The improvement comprises the inclusion in the electrodeposition bath composition of an organic phosphorous-based compound of the structure:

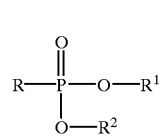

(I)

where R is a monovalent hydrocarbon or R'O; $R^1$ and $R^2$ can be the same or different and are independently H or a monovalent hydrocarbon group, and R' is H or a monovalent hydrocarbon group, provided that at least one of R', $R^1$ and $R^2$ is a monovalent hydrocarbon group; or

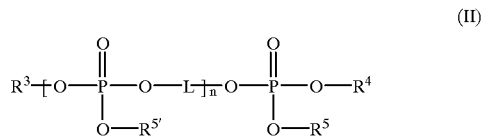

(II)

or

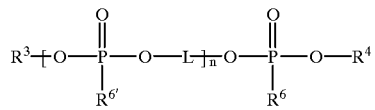
(III)

where n is 0 to 100; $R^3$, $R^4$, $R^5$ and $R^{5'}$ can be the same or different and are independently H, a monovalent hydrocarbon group, a residue of a monoepoxide or a residue of a polyepoxide; L is a divalent linking group derived from a polyepoxide; and $R^6$ and $R^{6'}$ can be the same or different and are monovalent hydrocarbon groups.

Also provided is a method of electrocoating a conductive substrate serving as a cathode in an electrical circuit, comprising the cathode and an anode which are immersed in the aqueous electrodeposition bath composition described immediately above and metallic substrates coated by the method.

Other than in the operating examples, or where otherwise indicated, all numbers expressing quantities of ingredients or reaction conditions used in the specification and claims are to be understood as being modified in all instances by the term "about". As used herein, in the specification and/or the claims, the term "polymer" is meant to include oligomers.

DETAILED DESCRIPTION OF THE INVENTION

Generally, the electrodeposition bath compositions of the present invention comprise a resinous phase dispersed in an aqueous medium wherein the resinous phase comprises the following components: (a) an ungelled active hydrogen group-containing cationic electrodepositable resin and (b) a curing agent having functional groups reactive with the functional groups of (a), wherein the improvement comprises an electrodeposition bath composition, preferably a lead-free electrodeposition bath, containing an organic phosphorous-based compound of the structure (I), (II) or (III), where n, R, R', $R^1$, $R^2$, $R^3$, $R^4$, $R^5$, $R^{5'}$, L, $R^6$ and $R^{6'}$ are as described above for these structures.

Preferably, R is a monovalent hydrocarbon group. By "monovalent hydrocarbon group" is meant herein an organic group containing essentially carbon and hydrogen. The hydrocarbon group may be aliphatic, aromatic, cyclic or acyclic and may contain from 1 to 24 (in the case of aromatic from 3 to 24) carbon atoms. Optionally, the hydrocarbon groups may be substituted with heteroatoms, typically oxygen or nitrogen. Non-limiting examples of such monovalent hydrocarbon groups are alkyl, alkoxy, aryl, alkaryl or alkoxyaryl groups.

It is preferred that the organic phosphorous-based compound is a phosphonic acid of the structure (I) wherein R is a monovalent hydrocarbon group, and $R^1$ and $R^2$ are both H. In the preferred embodiment of the invention, the organic phosphorous-based compound is of the structure (I) wherein $R^1$ and $R^2$ are both H and R is an aromatic group, preferably phenyl, that is, the organic phosphorous-based compound is phenyl phosphonic acid. Examples of other phosphonic acids suitable for use in the electrodeposition bath compositions of the invention include, but are not limited to, butyl phosphonic acid, naphthyl phosphonic acid and dodecyl phosphonic acid. Preferably, the phenyl phosphonic acid is present in the electrodeposition bath composition in an amount of 50 parts per million to 300 parts per million, most preferably 100 parts per million to 225 parts per million, based on total weight of the electrodeposition bath composition.

In another preferred embodiment of the present invention, the organic phosphorous-based compound is a phosphonate ester of structure (I) where R is a monovalent hydrocarbon group and at least one of $R^1$ and $R^2$ is a monovalent hydrocarbon group. Such phosphonate esters can be prepared from, for example, a phosphonic acid having the structure (I) where R is a monovalent hydrocarbon group and $R^1$ and $R^2$ are both H, and an alcohol or polyol. Illustrative of alcohols or polyols useful in this reaction are methanol, ethanol and butanol, isopropanol, benzyl alcohol, and mixtures thereof. Suitable examples of such phosphonate esters include dimethyl phenyl phosphonate, dipropyl phenyl phosphonate, ethyl phenyl phosphonate, dipropylphenyl phosphonate and the like.

Also useful in the invention are phosphoric acid esters having the structure (I) where R is OR' and at least one of R', $R^1$ and $R^2$ is a monovalent hydrocarbon group. Such phosphate esters can be prepared from, for example, phosphoric acid and an alcohol or polyol, such as those described above. Suitable examples of such phosphate esters include diethyl phosphate, dibutyl phosphate, phenyl acid phosphate and the like.

The organic phosphorous-based compounds useful in the electrodeposition bath compositions of the invention can also include those compounds having the structure (II) and (III), i.e., phosphoric acid esters of monoepoxides and polyepoxides, and phosphonic acid esters of monoepoxides and polyepoxides, respectively, where $R^3$, $R^4$, $R^5$, $R^{5'}$, $R^6$ and $R^{6'}$ are as described above for those structures, and n is 0 to 100, preferably 3 to 90, and more preferably 10 to 25. L can be any divalent linking group which is derived from a polyepoxide, that is, a 1,2-epoxide having an epoxy equivalent of at least 2. Preferably, L is derived from a diepoxide such as Bisphenol A diglycidyl ether and 1,4-butanediol bisglycidyl ether.

Suitable phosphoric acid esters of epoxides are prepared from the reaction of a phosphoric acid and an epoxide. The epoxides useful in the preparation of these phosphoric acid esters are 1,2-epoxides having an epoxy equivalency of at least 1, specifically, monoepoxides having a 1,2-epoxy equivalent of 1, or polyepoxides having a 1,2-epoxy equivalent of 2 or more.

Illustrative of the monoepoxides are monoglycidyl ethers of monohydric phenols or alcohols such a phenyl glycidyl ether and butyl glycidyl ether. Examples of polyepoxides are polyglycidyl ethers of polyhydric phenols, which are preferred, such as the polyglycidyl ether of 2,2-bis(4-hydroxyphenyl) propane(bisphenol A) and 1,1-bis(4-hydroxyphenyl) isobutane. Besides polyhydric phenols, other cyclic polyols can be used, particularly cycloaliphatic polyols such as hydrogenated bisphenol A. In addition, polyglycidyl ethers of polyhydric alcohols such as ethylene glycol, 1,2-propylene glycol and 1,4-butyleneglycol can be used. Mixtures of monoepoxides and polyepoxides may also be used.

Such phosphonic acid esters of epoxides, are the reaction product of a phosphonic acid and a 1,2-epoxide such as the monoepoxides and polyepoxides described above. The phosphonic acids suitable for use in this reaction are those having the structure (I) where R is a monovalent hydrocarbon and $R^1$ and $R^2$ are both H. Examples of suitable phosphonic acids include ethyl phosphonic acid, carboxyethyl phosphonic acid and alpha-aminomethylene phosphonic acids such as (2-hydroxyethyl) aminobis (methylenephosphonic) acid, isopropylaminobis (methylenephosphonic) acid. The aminomethylene phosphonic acids are described in U.S. Pat. No. 5,034,556, column 2, line 52, to column 3, line 43. Examples of suitable phosphonic acid esters of epoxides include the carboxyethylene phosphonic acid esters of butyl glycidyl ether, cyclohexyl diglycidyl ether, phenylglycidyl and bisphenol A diglycidyl ether and mixtures thereof.

The organic phosphorous-based compound is typically present in the electrodeposition bath compositions of the invention in an amount from 50 parts per million to 500 parts per million, preferably from 100 parts per million to 300 parts per million, and most preferably from 150 parts per million to 225 parts per million based on total weight of the electrodeposition bath composition.

As previously indicated, the resinous phase of the electrodeposition bath compositions of the present invention is comprised of (a) an ungelled active hydrogen group-containing cationic electrodepositable resin as a film-forming resin. By "ungelled" is meant that the polymer is substantially free of crosslinking and has an intrinsic viscosity when dissolved in a suitable solvent. The intrinsic viscosity of a polymer is an indication of its molecular weight. A gelled polymer, on the other hand, since it is of essentially infinitely high molecular weight, will have an intrinsic viscosity too high to measure.

Examples of cationic film-forming resins suitable for use in the electrodeposition bath compositions of the present invention include amine salt group-containing resins such as the acid-solubilized reaction products of polyepoxides and primary or secondary amines such as those described in U.S. Pat. Nos. 3,663,389; 3,984,299; 3,947,338; and 3,947,339. Usually, these amine salt group-containing resins are used in combination with a blocked isocyanate curing agent. The isocyanate can be fully blocked as described in the aforementioned U.S. Pat. No. 3,984,299 or the isocyanate can be partially blocked and reacted with the resin backbone such as described in U.S. Pat. No. 3,947,338. Also, one-component compositions as described in U.S. Pat. No. 4,134,866 and DE-OS No. 2,707,405 can be used as the film-forming resin. Besides the epoxy-amine reaction products, film-forming resins can also be selected from cationic acrylic resins such as those described in U.S. Pat. Nos. 3,455,806 and 3,928,157.

Besides amine salt group-containing resins, quaternary ammonium salt group-containing resins can also be employed. Examples of these resins are those which are formed from reacting an organic polyepoxide with a tertiary amine salt. Such resins are described in U.S. Pat. Nos. 3,962,165; 3,975,346; and 4,001,101. Examples of other cationic resins are ternary sulfonium salt group-containing resins and quaternary phosphonium salt-group containing resins such as those described in U.S. Pat. Nos. 3,793,278 and 3,984,922, respectively. Also, film-forming resins which cure via transesterification such as described in European Application No. 12463 can be used. Further, cationic compositions prepared from Manich-bases such as described in U.S. Pat. No. 4,134,932 can be used.

The resins to which the present invention is particularly effective are those positively charged resins which contain primary and/or secondary amine groups. Such resins are described in U.S. Pat. Nos. 3,663,389; 3,947,339; and 4,116,900. In U.S. Pat. No. 3,947,339, a polyketimine derivative of a polyamine such as diethylenetriamine or triethylenetetraamine is reacted with a polyepoxide. When the reaction product is neutralized with acid and dispersed in water, free primary amine groups are generated. Also, equivalent products are formed when polyepoxide is reacted with excess polyamines such as diethylenetriamine and triethylenetetraamine and the excess polyamine vacuum stripped from the reaction mixture. Such products are described in U.S. Pat. Nos. 3,663,389 and 4,116,900.

The active hydrogen group-containing cationic electrodepositable resin (a) described above is present in the electrodeposition bath compositions of the invention in amounts of about 1 to about 60 percent by weight, preferably about 5 to about 25 based on total weight of the electrodeposition bath composition.

The resinous phase of the electrodeposition bath of the present invention further comprises (b) a curing agent adapted to react with the active hydrogen groups of the cationic electrodepositable resin (a) described immediately above. The preferred curing agents for use in cathodic electrodeposition are blocked organic polyisocyanates. The polyisocyanates can be fully blocked as described in U.S. Pat. No. 3,984,299 column 1 lines 1 to 68, column 2 and column 3 lines 1 to 15, or partially blocked and reacted with the polymer backbone as described in U.S. Pat. No. 3,947,338 column 2 lines 65 to 68, column 3 and column 4 lines 1 to 30, which are incorporated by reference herein. By "blocked" is meant that the isocyanate groups have been reacted with a compound so that the resultant blocked isocyanate group is stable to active hydrogens at ambient temperature but reactive with active hydrogens in the film forming polymer at elevated temperatures usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates such as triisocyanates can be used. An example would include triphenylmethane-4,4',4"-triisocyanate. Isocyanate ( )-prepolymers with polyols such as neopentyl glycol and trimethylolpropane and with polymeric polyols such as polycaprolactone diols and triols (NCO/OH equivalent ratio greater than 1) can also be used.

The polyisocyanate curing agents are typically utilized in conjunction with the active hydrogen containing cationic electrodepositable resin in amounts ranging from 1 weight percent to 65 weight percent, preferable from 5 weight percent to 45 weight percent, based on the total weight of the electrodeposition bath composition.

The aqueous compositions of the present invention are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, preferably less than 0.15 micron.

The concentration of the resinous phase in the aqueous medium is at least 1 and usually from about 2 to about 60 percent by weight based on total weight of the aqueous dispersion. When the compositions of the present invention are in the form of resin concentrates, they generally have a resin solids content of about 20 to about 60 percent by weight based on weight of the aqueous dispersion.

Electrodeposition baths of the invention are typically supplied as two components: (1) a clear resin feed, which includes generally the active hydrogen-containing ionic electrodepositable resin, i.e., the main film-forming polymer, the curing agent, and any additional water-dispersible, non-pigmented components; and (2) a pigment paste, which generally includes one or more pigments, a water-dispersible grind resin which can be the same as or different from the main-film forming polymer, and, optionally, additives such as wetting or dispersing aids. Electrodeposition bath components (1) and (2) are dispersed in an aqueous medium which comprises water and, usually, coalescing solvents.

It should be appreciated that there are various methods by which the organic phosphorous-based compound can be incorporated into the electrodeposition bath composition. As is preferred, the organic phosphorous-based compound may be diluted in water (to form an aqueous solution thereof) and added directly to the bath without prior blending or reacting with other components. Alternatively, the organic phosphorous-based compound solution can be added to the predispersed clear resin feed which may include the cationic resin, the curing agent and/or any other non-pigmented component. In some instances, it may be desirable to blend the organic phosphorous-based compound solution with the pigment paste component prior to the incorporation of the paste to the electrodeposition bath.

The electrodeposition bath of the present invention has a resin solids content usually within the range of about 5 to 25 percent by weight based on total weight of the electrodeposition bath.

As aforementioned, besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. The amount of coalescing solvent is generally between about 0.01 and 25 percent and when used, preferably from about 0.05 to about 5 percent by weight based on total weight of the aqueous medium.

As discussed above, a pigment composition and, if desired, various additives such as surfactants, wetting agents or catalyst can be included in the dispersion. The pigment composition may be of the conventional type comprising pigments, for example, iron oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as a pigment-to-resin ratio. In the practice of the invention, when pigment is employed, the pigment-to-resin ratio is usually within the range of about 0.02 to 1:1. The other additives mentioned above are usually in the dispersion in amounts of about 0.01 to 3 percent by weight based on weight of resin solids.

The electrodepositable coating compositions of the present invention can be applied by electrodeposition to a variety of electroconductive substrates especially metals such as untreated steel, galvanized steel, aluminum, copper, magnesium and conductive carbon coated materials. The applied voltage for electrodeposition may be varied and can be, for example, as low as 1 volt to as high as several thousand volts, but typically between 50 and 500 volts. The current density is usually between 0.5 ampere and 5 amperes per square foot and tends to decrease during electrodeposition indicating the formation of an insulating film.

After the coating has been applied by electrodeposition, it is cured usually by baking at elevated temperatures such as about 90° to about 260° C. for about 1 to about 40 minutes.

Illustrating the invention are the following examples which, however, are not to be considered as limiting the invention to their details. All parts and percentages in the following examples as well as throughout the specification are by weight unless otherwise indicated.

EXAMPLES

Examples A and B describe the preparation of cationic electrodepositable resins. The resin of Example A also contains a polyurethane crosslinker. Examples C and D describe the preparation of quaternary ammonium salt group-containing pigment grinding resins. Example AA describes the preparation of a pigment paste suitable for use in the electrodeposition bath compositions of the invention. Example BB describes the preparation of electrodeposition bath premixes for use in the electrodeposition bath compositions of Examples 1 through 9. Example CC describes the preparation of electrocoat bath premixes for mild steel corrosivity testing as described in Examples 10–15. Example DD describes the preparation of a dilute solution of an organic phosphorous-based acid for direct post addition to an electrocoat bath.

Table 1 summarizes the improvement in corrosion resistance as measured by scribe creep observed in accordance with ASTM-B117 when an organic phosphorous-based compound is included in lead-free electrodeposition bath compositions as detailed in the invention. Table 2 provides comparative examples of other phosphorous-based compounds and their respective effects on bare steel corrosion performance. Table 3 summarizes the effect of phosphorous-based compounds on cationic electrodeposition bath corrosivity of mild steel as measured by percent weight loss over time of a mild steel coupon immersed in the bath.

Example A

This example describes the preparation of a cationic electrodepositable resin containing a polyurethane crosslinker for use in the electrodeposition bath compositions of the present invention. Example A-1 describes the preparation of the polyurethane crosslinker. Example A-2 describes the preparation of the cationic resin containing the polyurethane crosslinker of Example A-1. Example A-3 describes the preparation of the aqueous dispersion of the cationic resin of Example A-2.

Example A-1

A polyurethane crosslinker was prepared from a mixture of the following ingredients:

| INGREDIENTS | WEIGHT (grams) | EQUIVALENTS |
|---|---|---|
| Charge I: | | |
| Trimethylolpropane | 170.8 | 3.821 |
| Ethanol | 439.5 | 9.554 |
| Methanol | 305.6 | 9.550 |
| Propylene glycol | 1161.4 | — |
|  | (15.282 moles) | — |
| Methyl isobutyl ketone | 710.8 | |

-continued

| INGREDIENTS | WEIGHT (grams) | EQUIVALENTS |
|---|---|---|
| Charge II: | | |
| PAPI 2940[1] | 5042.9 | 38.204 |
| Methyl isobutyl ketone | 1249.3 | — |

[1]Polymeric methylene diphenyl diisocyanate available from The Dow Chemical Co.

The ingredients of Charge I were added to a suitably equipped 12 liter round-bottom flask. Under mild agitation these ingredients were heated under a nitrogen blanket to a temperature of 50° C. The PAPI 2940 was added gradually over a period of about 2.25 hours with the temperature rising to 110° C., followed by a rinse of about 176.6 grams of the methyl isobutyl ketone. The reaction mixture was held at 110° C. until no isocyanate was detected by infrared spectroscopy. The remaining 1072.7 grams of methyl isobutyl ketone were then added to the reaction mixture, which had a final solids content of about 76.9% (1 hour at 110° C.)

Example A-2

A cationic resin was prepared from a mixture of the following ingredients:

| INGREDIENTS | WEIGHT (grams) | EQUIVALENTS |
|---|---|---|
| Charge I: | | |
| Polyurethane crosslinker as prepared in Example A | 2825.1 | |
| EPON 880[1] | 1971.6 | 10.487 |
| Bisphenol A | 541.6 | 4.751 |
| BPA/EO adduct[2] | 1260.4 | 2.681 |
| TETRONIC 150R1[3] | 1.7 | — |
| Methyl isobutyl ketone | 127.3 | — |
| Charge II: | | |
| Aminopropyldiethanolamine[4] | 319.5 | 3.944 |
| Diethanolamine | 103.5 | 0.985 |
| Benzyldimethylamine | 3.9 | — |

[1]Diglycidyl ether of Bisphenol A commercially available from Shell Oil and Chemical Co.
[2]Adduct prepared from 1:2 molar ratio of ethoxylated Bisphenol A (9 moles of ethylene oxide per mole Bisphenol A) and hexahydrophthalic anhydride mixed in the presence of 0.05% triethylamine catalyst and held at 100° C. for 3.5 hours.
[3]Surfactant commercially available from BASF Corp.
[4]Commercially available from Huntsman Corporation.

The ingredients of Charge I were added to a suitably equipped 12 liter round bottom flask. The reaction mixture was stirred under mild agitation and heated under a nitrogen blanket to a temperature of about 50° C., followed by the addition of Charge II. The reaction mixture was allowed to exotherm and after the exotherm had expired, the reaction temperature was adjusted to about 120° to 123° C. and held at that temperature for about 3 hours. The reaction mixture had an epoxy equivalent weight of 21,000 based on solids, an amine content of 0.75 milliequivalents per gram based on solids, and a Gardner-Holdt bubble viscosity of T/U (when reduced to 50% solids with 1-methoxy-2-propanol).

Example A-3

An aqueous dispersion of the cationic resin prepared above was prepared from a mixture of the following ingredients:

| INGREDIENTS: | WEIGHT (grams) | EQUIVALENTS |
|---|---|---|
| Charge I: | | |
| Sulfamic acid | 143.5 | 1.478 |
| RHODAMEEN C-5[1] | 59.4 | — |
| Deionized water | 6484.9 | — |
| Charge II: | | |
| Cationic resin prepared in Example A-2 | 6900.0 | |
| Gum rosin[2] | 206.3 | |
| Deionized water | 3185.9 | |

[1]Ethoxylated cocoamine surfactant available from Rhone-Poulenc, USA.
[2]30% solution of gum rosin (commercially available from Aldrich Chemical Company) in methyl isobutyl ketone.

Charge I was added as abietic acid to a bath equipped with an agitator and heated to a temperature of 50° C. At this temperature, the cationic resin was added and mixed for about 20 minutes until thoroughly dispersed, at which time deionized water was gradually added. The dispersion was heated to a temperature of about 600 to 65° C. and subjected to a reduced pressure of about 20 inches mercury over a period of about 2 hours during which time the methyl isobutyl ketone was removed by vacuum distillation. The resulting dispersion had a solids of 41.9% (1 hour at 110° C.)

Example B

A cationic resin was prepared from a mixture of the following ingredients:

| INGREDIENTS: | WEIGHT (grams) | EQUIVALENTS |
|---|---|---|
| Charge I: | | |
| EPON 880 | 376.0 | 2.000 |
| Bisphenol A | 148.0 | 1.300 |
| BPA/EO adduct[1] | 5.2 | 0.020 |
| Solvent[2] | 59.6 | |
| Ethyltriphenyl phosphonium iodide | 0.53 | |
| Charge II: | | |
| Methylethanolamine | 0.1 | 0.001 |
| Diketimine[3] | 235.9 | 0.629 |

[1]Adduct of Bisphenol A and a diol containing 6 ethylene oxide, commercially available as MACOL 98A MOD1 from BASF Corp.
[2]Reaction product of 2 moles of diethylene glycol monobutyl ether and 1 mole formaldehyde, 98% active, prepared as described in U.S. Pat. No. 4,891,111 to McCollum et al.
[3]Diketimine derived from diethylene triamine and methyl isobutyl ketone (73% solids in methyl isobutyl ketone), prepared as described in U.S. Pat. No. 3,947,339 to Jerabek.

To a suitably equipped 5 liter flask the ingredients of Charge I were added under mild agitation in the order shown above. The reaction mixture was heated to a temperature of 125° C. under a nitrogen blanket, then allowed to exotherm to a temperature of about 145° to 160° C. and subsequently held for one hour at a temperature of about 145° C. The reaction mixture was then cooled to a temperature of about 125° C. at which time the ingredients of Charge II were added and the reaction mixture was held for two additional hours at that temperature. After the hold period, approximately 85% of the reaction product was slowly poured into an acetic acid solution (28.9 g (0.481 equivalents) and 190.0 grams deionized water) and allowed to mix for 30 minutes. Additional deionized water was added to reduce the dispersion solids to 36% (1 hour @ 110° C.). The cationic dispersion was then vacuum stripped to remove methyl isobutyl ketone.

Example C

This example describes the preparation of a quaternary ammonium salt functional pigment grinding resin. Example C-1 describes the preparation of an amine-acid salt quaternizing agent and Example C-2 describes the preparation of an epoxy group-containing polymer which is subsequently quaternized with the amine-acid salt of Example C-1.

Example C-1

The amine-acid salt quaternizing agent was prepared using the following procedure:

To a suitably equipped 5 liter flask were added 445 parts by weight N,N-dimethylethanolamine. Under mild agitation, 660 parts by weight PAPI 2940 (polymeric diisocyanate commercially available from the Dow Chemical Co.) were added slowly over a 1.5 hour period, followed by a rinse of 22.1 parts by weight of the solvent mentioned above for Example B. During this addition, the reaction mixture was allowed to exotherm to a temperature of about 89° C. and held at that temperature for about 1 hour until complete reaction of the isocyanate as determined by infrared spectroscopy. At that time, 512 parts by weight of an 88% aqueous lactic acid solution were added over a 25 minute period, followed by the addition of about 2136.11 parts by weight of deionized water. The reaction temperature was held at about 80° C. for about 6 hours until a stalled acid value of 70.6 was obtained.

Example C-2

The quaternary ammonium salt group-containing polymer was prepared using the following procedure:

To a suitably equipped 5 liter flask were added, under mild agitation, 528.8 parts by weight EPON 828 (polyglycidyl ether of Bisphenol A commercially available from Shell Oil and Chemical Co.); 224.9 parts by weight of Bisphenol A; 83.7 parts by weight of the solvent mentioned above in Example B; and 0.5 parts by weight of ethyltriphenylphosphonium iodide. The reaction mixture was heated to about 140° C., allowed to exotherm to about 180° C., then cooled to about 160° C. and held at that temperature for about 1 hour at which time the polymeric product had an epoxy equivalent weight of 982.9. The reaction mixture was then cooled to a temperature of about 130° C. at which time about 164.9 parts by weight of the solvent of Example B were added and the temperature lowered to about 95°–100° C., followed by the addition of about 418.4 parts by weight of the amine-acid quaternizing agent of Example C-1 over a period of 15 minutes, and subsequently followed by the addition of about 1428.1 parts by weight of deionized water. The reaction temperature was held at about 80° C. for approximately 6 hours until the acid number of the reaction product fell below 1.0. The resultant quaternary ammonium salt group-containing pigment grinding resin was further reduced with about 334.7 parts by weight of the solvent of Example B.

Example D

This example describes the preparation of a second quaternary ammonium salt group-containing pigment grinding resin. Example D-1 describes the preparation of an amine-acid salt quaternizing agent and Example D-2 describes the preparation of an epoxy group-containing polymer which is subsequently quaternized with the amine-acid salt of Example D-1.

Example D-1

The amine-acid salt quaternizing agent was prepared using the following procedure:

To a suitably equipped 5 liter flask were added under agitation 267.4 parts by weight N,N-dimethylethanolamine. At a temperature of about 23° C., 396 parts by weight of PAPI 2940 were slowly added over a 1.0 hour period, followed by a rinse of about 13.9 parts by weight of the solvent mentioned above in Example B. The temperature was allowed to exotherm to about 90° C. during this addition and was subsequently held at that temperature for about 45 minutes until the disappearance of the isocyanate as determined by infrared spectroscopy. At that time, 112.8 parts by weight of dimethylcocoamine were added followed by the addition of about 361.3 parts by weight of 88% aqueous lactic acid solution over a 15 minute period. About 695.0 parts by weight of deionized water were then added and the reaction temperature was held at about 85° C. for about 3 hours until a stalled acid value was obtained.

Example D-2

The quaternary ammonium salt group-containing polymer was prepared using the following procedure.

To a suitably equipped 5 liter flask were added 631.7 parts by weight EPON 828; 268.7 parts by weight Bisphenol A; 10.0 parts by weight of the solvent of Example B; and 0.6 parts of ethyltriphenylphosphonium iodide. The reaction mixture was heated to about 140° C. and allowed to exotherm to a temperature of about 180° C. at which time the reaction mixture was cooled to 160° C. and held for about 1 hour to an epoxy equivalent weight of 991.0. The reaction was further cooled to about 130° C. and 421.2 parts by weight of ethoxylated Bisphenol A (6 moles of ethylene oxide per mole of Bisphenol A) were added. Cooling was then continued until a temperature of about 80° C. was obtained, at which time 346.4 parts by weight of the amine-acid salt quaternizing agent of Example D-1 were added over a period of about 30 to 35 minutes, followed by the addition of 404.8 parts by weight of deionized water. The reaction mixture was held at a temperature of about 80° C. for about 6 hours until the acid number dropped below 1.0. The resultant quaternary ammonium salt group-containing pigment grinding resin was further reduced with 2232.2 parts by weight of deionized water.

Example AA

This example describes the preparation of a pigment paste suitable for use in the electrodeposition bath compositions of the present invention. The pigment paste was prepared from a mixture of the following ingredients:

| INGREDIENTS | WEIGHT (grams) |
| --- | --- |
| Quaternary ammonium salt group-containing grind resin of Example C | 2053.0 |
| Deionized water | 686.0 |

| | |
|---|---|
| TRONOX CR800[1] | 1725.0 |
| CSX-333[2] | 39.0 |
| OK-412[3] | 195.0 |
| Catalyst paste[4] | 545.0 |
| Deionized water | 127.0 |

[1]Titanium dioxide pigment available from Kerr-McGee Co.
[2]Carbon black beads available from Cabot Corp.
[3]Silica commercially available from Degussa Corp.
[4]Catalyst paste previously prepared from a mixture of the following components:

| INGREDIENTS | WEIGHT (g) |
|---|---|
| Quaternary ammonium salt group-containing grind resin of Example D | 632.0 |
| Deionized water | 92.0 |
| n-Butoxypropanol | 19.0 |
| FASCAT 4201[1] | 368.0 |

[1]Dibutyl tin oxide catalyst available from Elf-Atochem, Inc.

The above ingredients were added, in the order shown, under high shear agitation. After the ingredients were thoroughly blended, the pigment paste was transferred to a vertical sand mill and ground to a Hegman value of about 7.25.

Example BB

This example describes the preparation of an electrodeposition bath premix for use in the electrodeposition bath compositions of Examples 1 through 9 below. The electrodeposition bath premix was prepared from a mixture of the following ingredients:

| INGREDIENTS | WEIGHT (grams) |
|---|---|
| Cationic resin of Example A | 4532.7 |
| Cationic resin of Example B | 308.5 |
| Flexibilizer[1] | 419.5 |
| Flow additive[2] | 87.4 |
| Solvent of Example B | 64.2 |
| Pigment paste of Example AA | 950.5 |
| Deionized water | 4637.2 |

[1]The reaction product of a polyoxypropylenediamine with an aliphatic epoxide, Bisphenol A and benzyl dimethylamine prepared as follows: DER-732 (640.7 g, an aliphatic epoxide available from Dow Chemical Co), Bisphenol A (155.2 g), benzyl dimethyl amine (BDMA, 1.5 g), and methyl isobutyl ketone (MIBK, 11 g) were charged to a round bottom flask under nitrogen and heated to 130° C.After the initial exotherm, the reaction temperature was held at 135° C. until reaching an extrapolated EEW of 1230. An additional 49.6 g of MIBK was then added to cool the reaction mixture. Jeffamine D400 (168.1 g, a polyoxypropylenediamine commercially available from Huntsman Corporation) was added slowly enough to control the exotherm and maintain the reaction temperature at 90° C. to 95° C.After addition was complete, the reaction mixture was held at 95° C. for four hours at which time, 20.43 g of an 85% solids solution of Epon 828 (a diepoxide available from Shell Oil and Chemical) in 2-butoxyethanol was added. The reaction mixture was held at 95° C. for an additional hour.The resin (approximately 983.5 g after transfer losses) was then dispersed under high sheer in 1012 g of deionized water containing 31.68 g of lactic acid. The resulting dispersion was then reduced with an additional 660 g of water and vacuum stripped to a final resin solids of 36%.
[2]Reaction product of methylamine; propylene oxide; and toluene diisocyanate as described in Example 8 of U.S. Pat. No. 5,348,578.

Example CC

This example describes the preparation of an electrodeposition bath premix for use in the electrodeposition bath compositions of Examples 10–15 below. The electrodeposition bath premix was prepared from a mixture of the following ingredients:

| INGREDIENTS | WEIGHT (grams) |
|---|---|
| Cationic resin of Example A | 4532.7 |
| Cationic resin of Example B | 308.5 |
| Flexibilizer of Example CC | 419.5 |
| Flow additive[1] | 87.4 |
| Solvent of Example B | 64.2 |
| Pigment paste of Example AA | 950.5 |
| Deionized water | 4637.2 |

[1]Reaction product of methylamine; propylene oxide; and toluene diisocyanate as described in Example 8 of U.S. Pat. No. 5,348,578.

Electrodeposition Bath Preparation:

Under agitation, the cationic resin of Example B was diluted with approximately 15% of the total deionized water. The diluted resin was then stirred into the cationic resin of Example A. The flexibilizer resin was separately diluted with the solvent under agitation, then further diluted with about 30% of the total deionized water before adding to the cationic resin blend. The flow control additive was then added. The pigment paste was separately diluted with the remaining deionized water and added to the above resin blend. After two hours of agitation, the bath premix was further diluted with deionized water and the calcium acetate solution was then added. Final bath solids are about 22%, with a pigment to resin ratio of 0.17:1.0. The test baths were 15% ultrafiltered and replenished with fresh deionized water before electrocoating.

Example DD

This example describes the preparation of a phenyl phosphonic acid solution for use in the electrodeposition bath compositions of the Examples 1 through 6 below. The clear solution was prepared from a mixture of the following ingredients:

| INGREDIENTS | WEIGHT (grams) |
|---|---|
| Phenyl Phosphonic Acid[1] | 4.8 |
| Deionized water | 492.5 |

[1]Commercially available from Aldrich Chemical Co.

Examples 1–6

Examples 2 through 5 describe the preparation of electrodeposition bath compositions of the invention which contain varying weights of the phosphonic acid solution of Example DD post-added to the bath. Example 1 is a comparative example which contains no phosphonic acid. The electrodeposition bath compositions were prepared from a mixture of the following ingredients:

| | Example # | | | | | |
|---|---|---|---|---|---|---|
| | 1 | 2 | 3 | 4 | 5 | 6 |
| ppm of phenyl phosphonic acid | 0 | 50 | 100 | 200 | 300 | 500 |
| Ingredients: | Weight (g) | Weight (g) | Weight (g) | Weight (g) | Weight (g) | Weight (g) |
| Premix from Example BB | 2198.7 | 2198.7 | 2198.7 | 2198.7 | 2198.7 | 2198.7 |
| Solution from Example DD | 0.0 | 12.5 | 25 | 50 | 75 | 125 |
| Deionized water | 201.3 | 188.8 | 176.3 | 151.3 | 126.3 | 76.3 |

Comparative Examples 7–9

Comparative Examples 7 through 9 describe the preparation of electrodeposition bath compositions of the invention containing 200 parts per million by weight of ortho-phosphoric acid, 2-aminoethyl dihydrogen phosphate and 2-aminoethyl phosphonic acid respectively. The addition followed the same procedure used in examples 1–6, simply substituting the desired acid for the phenyl phosphonic acid as described above in example DD. The electrodeposition bath compositions were prepared from a mixture of the following ingredients:

| | Example #: | | |
|---|---|---|---|
| | 7 | 8 | 9 |
| ppm of additive: (w/w) | 200 | 200 | 200 |
| Additive: | ortho-Phosphoric acid | 2-Aminoethyl dihydrogen phosphate | 2-aminoethyl phosphonic acid |
| INGREDIENTS: | WEIGHT (g) | WEIGHT (g) | WEIGHT (g) |
| Premix of Example CC | 2198.7 | 2198.7 | 2198.7 |
| Additive solution | 50.0 | 50.0 | 50.0 |
| Deionized water | 151.3 | 151.3 | 151.3 |

Electrocoating General Procedure:

Each of the electrodeposition bath compositions of Examples 1 through 9 above were electrodeposited onto solvent cleaned, non-phosphated, cold rolled steel panels, commercially available from ACT Laboratories. Conditions for cationic electrodeposition of each were as follows: 2 minutes at 90° F. at 170–180 volts to yield a cured film thickness of 0.6 to 0.8 mils. The coated substrate was cured in an electric oven at 340° F. for 20 minutes. Appearance was visually rated for surface roughness and pinholing in the coating surface.

Corrosion Testing Procedure:

Each of the coated untreated steel test panels was scribed, cutting through the coating to the metal, in an "X" pattern. The test panels were then subjected to salt spray testing in accordance with ASTM-B117. Upon completion of the corrosion cycle, the panels were cleaned to remove non adhering paint. Test panels were then evaluated for "scribe creep" corrosion. Scribe creep is reported herein as the average total width (in millimeters) of corrosion perpendicular to the scribe mark. Test results are reported in Table 1 and Table 2.

TABLE 1

Appearance Ratings and Corrosion Resistance Testing Results for Examples 1–6

| EXAMPLE | 1* | 2 | 3 | 4 | 5 | 6 |
|---|---|---|---|---|---|---|
| PPM phenyl phosphonic acid | 0 ppm | 50 ppm | 100 ppm | 200 ppm | 300 ppm | 500 ppm |
| Appearance[1] | 10 | 10 | 10 | 10 | 9 | 8 |
| Scribe Creep (mm) | 28 | 25 | 18 | 19 | 18 | 20 |

[1]10 rating = no defects; 0 rating = rough and pinholed surface
*Comparative example.

TABLE 2

Appearance Ratings and Corrosion Resistance Test Results for Examples 7–9

| EXAMPLE | 7* | 8 | 9 |
|---|---|---|---|
| PPM additive | 200 | 200 | 200 |
| Appearance[1] | 7 | 8 | 8 |
| Scribe creep (mm) | 28 | 29 | 27 |

[1]10 rating = no defects; 0 rating = rough and pinholed surface
*Comparative example The data reported in the above in Table 1 and Table 2 illustrate the improvement in scribe creep corrosion resistance observed with the inclusion of phenyl phosphonic acid solutions in the electrodeposition bath compositions of the invention. Also, the data illustrate that the use of levels above 300 parts per million or more of phenyl phosphonic acid have a detrimental effect on coating appearance. Additionally, a comparison of the data for Example 4 and Comparative Example 7 (containing 200 ppm phenyl phosphonic acid and 200 ppm phosphoric acid, respectively), illustrates that the inclusion in an electrodeposition bath of an organic phosphorous-based compound according to the invention provides superior appearance and corrosion resistance properties to those observed with the inclusion of the same amount of phosphoric acid.

Examples 10–15

Examples 10–13 demonstrate the effectiveness of phosphonic acids in the prevention of mild steel corrosivity in electrocoat baths. Example 14 is a comparative example which uses 200 ppm by weight of ortho-phosphoric acid as the corrosivity inhibitor. Example 15 utilizes 300 ppm by weight of a polymeric "phosphatized epoxy" (the phosphoric acid ester of EPON 828). Baths were prepared according to the formulas shown below and then tested according the general procedure for corrosivity testing.

| Example # | 10 ortho-Phosphoric Acid | 11 Phenyl Phosphonic Acid | 12 Phenyl Phosphonic Acid | 13 Phenyl Phosphonic Acid | 14 ortho-Phosphoric Acid | 15 Phosphatized Epoxy |
|---|---|---|---|---|---|---|
| INGREDIENTS: | WEIGHT g | WEIGHT g | WEIGHT g | WEIGHT g | WEIGHT g | WEIGHT g |
| Premix of Example CC | 3481.3 | 3484.3 | 3481.3 | 3481.3 | 3481.3 | 3481.3 |
| Solution of Example DD | 0 | 19.8 | 59.4 | 79.2 | — | — |
| Phosphoric acid Solution[1] | — | — | — | — | 79.2 | — |
| Phosphatized Epoxy solution[2] | — | — | — | — | — | 118.8 |
| Deionized water | 18.7 | 298.9 | 259.3 | 239.5 | 239.5 | 199.9 |

[1] For comparative Example 14, the equivalent weight of ortho-phosphoric acid was substituted for phenyl phosphonic acid in the general procedure of Example DD.
[2] For Example 15, a phosphatized epoxy prepared from 4.14 parts by weight of Epon 828 (commercially available from Shell Oil and Chemical Company) to 1 part by weight of ortho-phosphoric acid in 2-butoxyethanol was used as the 1:1 on total solids weight replacement for phenyl phosphonic acid as described in Example DD.

Corrosivity Testing Procedure:

The electrocoat baths of Examples 10–15 described above were prepared according to the above described general procedure. The pH of the baths was then adjusted using acetic acid to a final pH of 6.0 using acetic acid. The electrocoat baths were subsequently heated to 104° F. using a temperature controlled water bath. Two very thin, mild steel coupons (approximately 1 inch wide by 3 inches long) were then attached to a stir shaft which was subsequently used to stir each of the paint baths at a speed of 100 rpm. The coupons were weighed using an analytical balance (allowing measurement to ±0.1 mg) prior to immersion in the bath. The coupons were re-weighed after 10 days of stirring and re-weighed again after 20 days of stirring. Initial weight of the coupons was typically 1.7 grams. The relative corrosivity of the electrodeposition baths was then determined by measuring the percentage weight loss of the mild steel coupons The results from this testing is reported in the following Table 3.

TABLE 3

Corrosivity of Electrodeposition Baths Containing Phosphonic Acid, ortho-Phosphoric acid and Phosphatized Epoxy (Average % weight loss of the two coupons)

| | Example # | | | | | |
|---|---|---|---|---|---|---|
| | 10 | 11 | 12 | 13 | 14 | 15 |
| PPM (w/w) of Additive: | 0 | 50 | 150 | 200 | 200 | 300 |
| | % Weight Loss | % Weight Loss | % Weight Loss | % Weight Loss | % Weight Loss | % Weight Loss |
| 10 Day | 40 | 0.06 | 0.27 | 0.03 | 0.06 | 3.2 |
| 20 Day | >90 | 0.10 | 0.47 | 0.03 | 0.08 | 5.7 |

The data of Table 3 above illustrate that the addition to a cationic electrodeposition bath composition of 50 to 200 parts per million based on bath weight of phenyl phosphonic acid provides corrosivity resistance equivalent to that of 200 parts per million of ortho-phosphoric acid. The data also illustrate that the addition of a phosphoric acid ester of an epoxide to the electrodeposition bath composition provides a substantial improvement in corrosivity resistance. (Compare test results for Example 10 and Example 15.)

We claim:

1. In an electrodeposition bath composition, said electrodeposition bath composition comprising a resinous phase dispersed in an aqueous medium, said resinous phase comprising the following components:

(a) an ungelled active hydrogen group-containing cationic electrodepositable resin;

(b) a curing agent having functional groups reactive with the active hydrogen groups of (a); the improvement comprising an electrodeposition bath containing at least one organic phosphorus-based compound of the formula

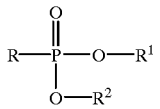

where R is a monovalent hydrocarbon group or R' O ; $R^1$ and $R^2$ can be the same or different and are independently H or a monovalent hydrocarbon group, and R' is H or a monovalent hydrocarbon group, provided that at least one of R', $R^1$ and $R^2$ is a monovalent hydrocarbon group; or

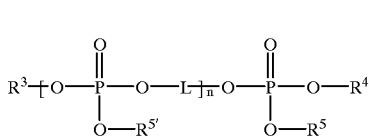

(II)

or

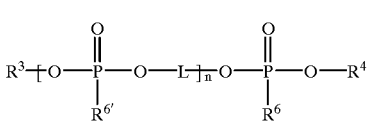

(III)

where n is 0 to 100; $R^3$, $R^4$, $R^5$ and $R^{5'}$ can be the same or different and are independently H, a monovalent hydrocarbon group, a residue of a monoepoxide or a residue of a polyepoxide; L is a divalent linking group derived from a polyepoxide; and R⁶ and R⁶' can be the same or different and are monovalent hydrocarbon groups.

2. The electrodeposition bath composition of claim 1 wherein the composition is substantially free of lead.

3. The electrodeposition bath composition of claim 1 wherein the organic phosphorous-based compound is present in an amount of from 10 parts per million to 500 parts per million based on total weight of the electrodeposition bath composition.

4. The electrodeposition bath composition of claim 1 wherein the organic phosphorous-based compound is a phosphonic acid ester having the structure (I) where R is a monovalent hydrocarbon group and at least one of $R^1$ and $R^2$ is a monovalent hydrocarbon group.

5. The electrodeposition bath composition of claim 1 wherein the organic phosphorous-based compound is a phosphoric acid ester having the structure (I) where R is OR' and at least one of R', $R^1$ and $R^2$ is a monovalent hydrocarbon group.

6. The electrodeposition bath composition of claim 1 wherein the organic phosphorous-based compound is a phosphonic acid having the structure (I) where R is a monovalent hydrocarbon group and $R^1$ and $R^2$ are both H.

7. The electrodeposition bath composition of claim 6 wherein R is an aromatic group.

8. The electrodeposition bath composition of claim 7 wherein the phosphonic acid is phenyl phosphonic acid.

9. The electrodeposition bath composition of claim 8 wherein the phenyl phosphonic acid is present in an amount of from 50 parts per million to 300 parts per million based on total weight of the electrodeposition bath composition.

10. In a method of electrocoating a conductive substrate serving as a cathode in an electrical circuit comprising said cathode and an anode, said cathode and anode being immersed in an aqueous electrocoating composition comprising passing electric current between said cathode and anode to cause deposition of the electrocoating composition on the substrate as a substantially continuous film, the aqueous electrocoating composition comprising:

(a) an ungelled active hydrogen group-containing cationic electrodepositable resin; and (b) a curing agent having functional groups reactive with the active hydrogen groups of (a), the improvement comprising an electrodeposition bath containing at least one organic phosphorous-based compound of the formula

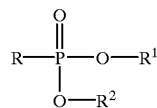

where R is a monovalent hydrocarbon group or R' O; $R^1$ and $R^2$ can be the same or different and are independently H or a monovalent hydrocarbon group, and R' is H or a monovalent hydrocarbon group, provided that at least one of R', $R^1$ and $R^2$ is a monovalent hydrocarbon group; or

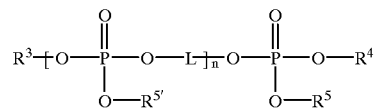

or

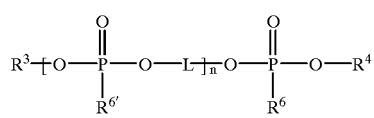

where n is 0 to 100; $R^3$, $R^4$, $R^5$ and $R^{5'}$ can be the same or different and are independently H, a monovalent hydrocarbon group, a residue of a monoepoxide or a residue of a polyepoxide; L is a divalent linking group derived from a polyepoxide; and $R^6$ and $R^{6'}$ can be the same or different and are monovalent hydrocarbon groups.

11. The method of claim 10 wherein the electrocoating composition is substantially free of lead.

12. The method of claim 10 wherein the organic phosphorous-based compound is present in an amount of from 10 parts per million to 500 parts per million based on total weight of the electrodeposition bath composition.

13. The method of claim 10 wherein the organic phosphorous-based compound is a phosphonic acid ester having the structure (I) where R is a monovalent hydrocarbon group and at least one of $R^1$ and $R^2$ is a monovalent hydrocarbon group.

14. The method of claim 10 wherein the organic phosphorous-based compound is a phosphoric acid ester having the structure (I) where R is OR' and at least one of R', $R^1$ and $R^2$ is a monovalent hydrocarbon group.

15. A metallic substrate coated by the method of claim 10.

16. The method of claim 10 wherein the organic phosphorous-based compound is a phosphonic acid having the structure (I) where R is a monovalent hydrocarbon group and $R^1$ and $R^2$ are both H.

17. The method of claim 16 wherein R is an aromatic group.

18. The method of claim 17 wherein the phosphonic acid is phenyl phosphonic acid.

19. The method of claim 18 wherein the phenyl phosphonic acid is present in an amount of from 50 parts per million to 300 parts per million based on total weight of the electrodeposition bath composition.

* * * * *